Feb. 5, 1946. M. R. BELL 2,394,423
BUILDING FORM
Filed June 24, 1941
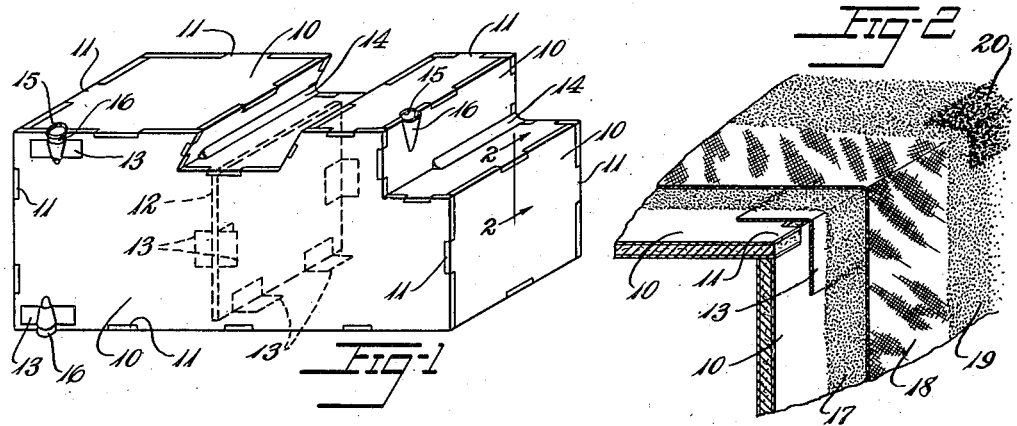
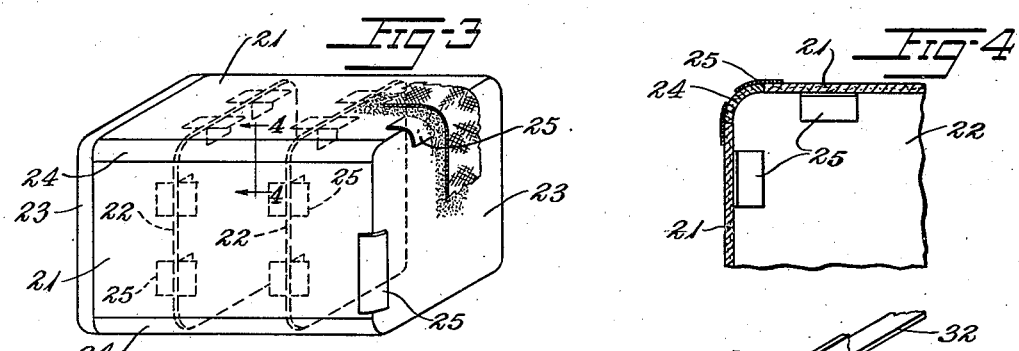
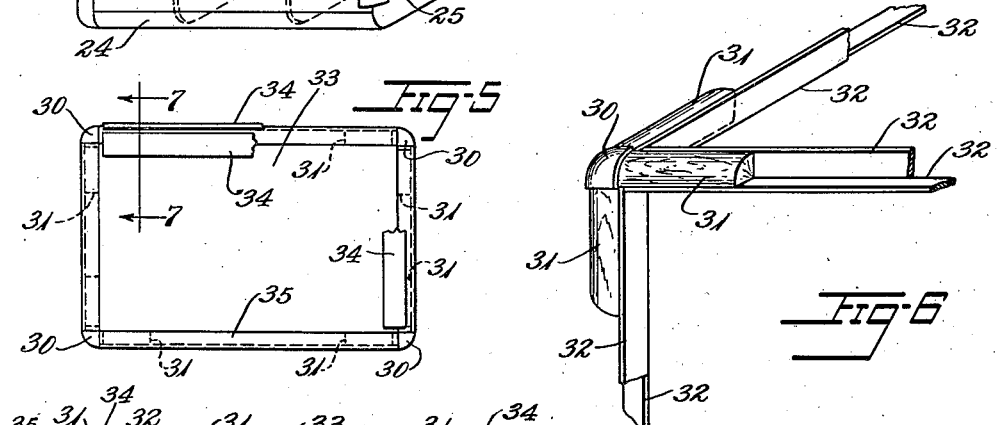
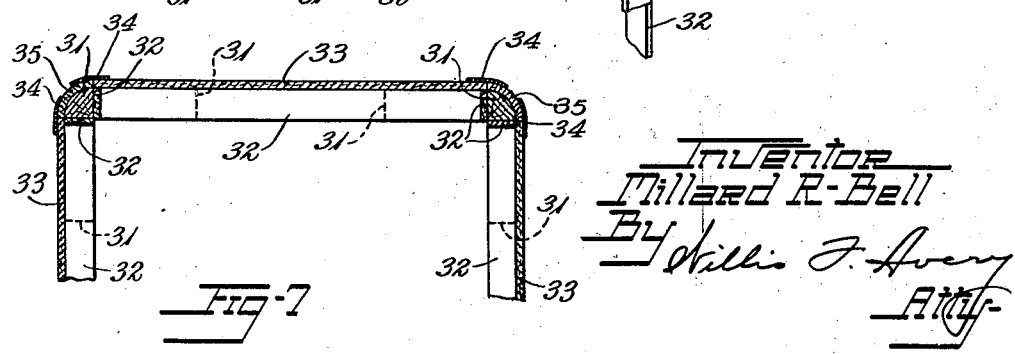
Inventor
Millard R. Bell Patented Feb. 5, 1946

2,394,423

UNITED STATES PATENT OFFICE 2,394,423

BUILDING FORM

Millard R. Bell, Los Angeles, Calif., assignor to
The B. F. Goodrich Company, New York, N. Y.,
a corporation of New York Application June 24, 1941, Serial No. 399,483

7 Claims. (Cl. 18—45)

This invention relates to a new kind of building form for the construction of tanks or containers built up from laminated sheets of flexible or resilient material; it has as its chief object to provide an inexpensive, light-weight, and strong building form for such articles as self-sealing gasoline tanks made from laminated sheets of rubber or the like, said building form being easily removable from the tank through a small opening after completion of the tank.

Forms for the construction of hollow articles have been made from sheets of metal which can be collapsed or coiled up in order to facilitate their removal from the finished article through a small hand-hole. It has been found, however, that this type of form is best adapted to cylindrical tanks, where a more or less uniformly rounded surface is desired. In the case of self-sealing gasoline tanks, especially those used in airplanes where all available space must be utilized, very irregular shapes, designed to fit around structural members and projections such as are found in wing sections, are often required. Obviously, coilable metal forms are ill-adapted for this type of construction.

The use of metal forms which are hinged or otherwise adapted to be collapsed after use involves expensive and complicated equipment which is difficult to operate and maintain.

The building form must not only be easily removable, but also must be sturdy enough to permit the construction of a laminated tank thereon, a process which entails rolling each successive layer to insure adhesion to the next layer below it. Since the finished tank is cured, that is, the rubber portions are vulcanized, before removal of the form, the latter must be able to withstand temperatures up to about 300° F. or more. Moreover, the form must provide a surface with sufficient building tack so that the innermost layer of the tank construction can be laid on without any wrinkles or trapped air between it and the form. Failure to provide a smooth and even inner layer leads to the formation of blisters between the layers and to the separation of the plies during curing with subsequent weakening of the tank. After curing, the adhesion between the form and the tank must be such that the form can be cleanly removed, leaving no scraps adhering to the inner surface of the tank which might later contaminate the contents.

I have now discovered a building form which combines all these desirable characteristics. In its preferred form it is constructed substantially of boxboard, corrugated cardboard, millboard, strawboard, or similar light-weight, strong, and inexpensive material which can readily be torn into small pieces inside the finished tank and removed through a hand-hole. Some of the details of construction of my new forms are shown in the accompanying drawing.

In this drawing,

Fig. 1 is a view in perspective of a typical building form;

Fig. 2 is a detailed view in perspective of the construction partly broken away and in section taken along line 2—2 of Fig. 1;

Fig. 3 is a view in perspective of another modification of my building form;

Fig. 4 is a cross-section of Fig. 3 taken along line 4—4;

Fig. 5 is a plan view, partly broken away, of a third modification of my invention;

Fig. 6 is a detailed view in perspective of one of the corners of the construction shown in Fig 5;

Fig. 7 is a cross-section taken along line 7—7 of Fig. 5.

In Fig. 1, walls 10 are members cut to the desired shape from flat sheets of cardboard, boxboard, corrugated cardboard, strawboard, millboard, or a similar material. I have found that ¼" corrugated boxboard is quite satisfactory for even the largest forms. In order to provide a sturdy construction and prevent the edges from sliding over each other it is usually desirable to lock the edges, as at 11, although a folded edge or any other suitable method of construction is satisfactory. When one side of the form is a large flat surface, it may be supported with a partition, as partition 12 supports the bottom surface in Fig. 1. The partition may be fastened in place, and the edges of the form may be bound together by means of an adhesive tape 13 such as the rubber-faced paper or cellulose known as Scotch tape, or the like. Because of the difficulty of pressing the successive plies of material closely into reentrant angles in the form, with the subsequent formation of blisters and separation of the plies during cure, it is usually desirable to fill up these angles, at least partially, with triangular fillets 14 of rubber or other suitable material. Since this fillet does not form a part of the finished tank but remains with the form, the particular material from which it is made is not important. In order to obtain complete drainage or venting of the finished tank, it may be desirable to build an outlet into the edge of the tank. One method of doing this is shown in Fig. 1 where a semi-circular hole 15 is cut at the edge of one surface 10 of the form. The other half of the circular outlet is formed by a section of a cardboard cylinder 16 placed flat against the opposing wall surface and held in place with adhesive tape; this construction places the center of the outlet in line with the edge of the form.

In Fig. 2 a detailed view of the construction of one corner is shown. The flat pieces of corrugated cardboard 10 are locked together at 11 and covered with adhesive tape 13. It has been found in practice that if the tank construction is built directly upon the surface of the cardboard form, it is extremely difficult to remove the cardboard cleanly from the inner surface of the finished tank; small pieces tend to tear off from the cardboard and remain stuck to the tank. I have found that this difficulty can be overcome by covering the cardboard with a material of greater tear resistance. A suitable material is thin cotton sheeting, although other fabrics or sheets of synthetic material having a similar tear resistance may be used. The cotton sheeting may be applied to the cardboard by means of any of the ordinary adhesives, such as glue, paste, rubber cement, or the like. In order to supply building tack, that is, sufficient adhesiveness to permit laying a smooth, close-fitting inner ply on the surface of the cloth I have found it advisable to coat the outer surface of the cloth with non-curing rubber latex, which, when dry, provides sufficient tack for that purpose, but which does not set up or cure into the tank itself so that the fabric cannot be easily removed. In addition to this adhesive it is usually desirable to provide an additional layer of stronger adhesive at the corners and edges. This adhesive may be composed of the same material as the inner layer of the tank, and so form a part of it after the cure. A construction of this kind is shown in Fig. 2, in which tape 13 covering the edge is covered with rubber cement 17, cotton sheeting 18, latex cement 19, and an oil-resistant synthetic rubber cement 20 of the same composition as the inner surface of the tank.

When rounded corners and edges are desired for the form, different modifications of my invention may be used. In Fig. 3 the walls 21 and partitions 22 are cut from flat corrugated cardboard, but the end-pieces 23 and edging strips 24 are molded to shape from papier-mâché, or from a combination of papier-mâché with other materials, such as clay, plaster of Paris, etc., or from any other suitable frangible material. These molded pieces are then fastened to the remainder of the structure with adhesive tape 25, and the whole is covered with fabric just as in Fig. 2. The papier-mâché parts may be removed with about as much ease as the boxboard.

An alternative construction for obtaining rounded corners and edges is shown in Figs. 5, 6 and 7. The corner pieces 30 are of wood, and are provided with arms 31 extending in three directions. The arms are short enough so that the whole piece may be withdrawn through the hand-hole used for extraction of the rest of the form. Braces for the corner pieces are provided in the form of strips of cardboard 32 extending along the inner surface of arms 31 between each pair of adjacent corners. As in the other modifications, flat cardboard 33 may be used for the sides and ends. The rounded edges between the corners may be formed from strips of cardboard 35, scored lengthwise or of single-faced corrugated boxboard bent to fit over the surfaces of the arms 31 extending between the corner pieces. The whole structure may be bound together with adhesive tape 34 and covered with fabric as in Fig. 2.

In practice I have used my new building form in the construction of self-sealing gasoline or oil tanks, such as are employed in airplanes. The fittings for the inlet and outlet tubes, vents, etc., are placed in holes accurately cut in the form, and the various laminations are built up around them, each layer being cut to fit and carefully rolled in place to insure good adhesion between the layers and removal of all air bubbles. After the desired construction has been completed, the whole article, while still on the building form, is wrapped tightly with wet cloth tape and cured in air at a temperature of 250° to 300° F. The wrapping with cloth tape is desirable to prevent formation of blisters and separation of plies during the cure.

After completing the cure and cooling the article the building form may be removed through the small opening provided for that purpose by tearing it into small pieces. If desired, the form may first be softened by applying water. A knife or other instrument is usually unnecessary, and indeed undesirable because of the danger of cutting the inner surface, because the corrugated boxboard is easily torn with the bare hands, while the papier-mâché construction may be first cracked by pressure applied on the outside of the flexible container, then torn as the boxboard is. By careful removal of the fabric which covered the form complete removal of the cardboard and papier-mâché is assured.

The use of my building form is not limited to articles substantially completely enclosed but may also extend to open-faced articles, although the advantages of my invention are much more clearly shown in the former case.

From the foregoing description of my invention it is apparent that my device supplies a long-felt want in the fabrication of bulletproof and shockproof gasoline and oil tanks. The construction of my invention is strong and also very light, a factor of great importance because of the manipulation of the forms necessary in the application of the successive plies. It is easily removable through a small hand-hole, no special tools or equipment being necessary other than a knife. Moreover, the cost of this new building form is extremely low, and may be reduced still further by production of standardized shapes on a large scale.

Although I have herein disclosed specific embodiments of my invention, it is apparent that there are numerous modifications and variations falling within the spirit and scope of the appended claims.

I claim:

1. A building form for the production of hollow articles from sheets of rubber-like material comprising a box-like structure of corrugated cardboard, a fabric sheet adhered to the external surface thereof, and a layer of non-curing adhesive on the external surface of the fabric.

2. A building form for the production of hollow articles from sheets of rubber-like material comprising a rigid form constructed from readily destructible preformed sheets of fibrous material and covered with a layer of non-curing adhesive.

3. A building form for the production of hollow articles from sheets of rubber-like material comprising a box-like structure of strawboard with interlocked edges, a fabric sheet adhered to the external surface thereof, a layer of non-curing adhesive on the external surface of the fabric, and an additional layer of curing adhesive on the corners and edges of the fabric-covered form.

4. A building form for the production of substantially completely enclosed hollow articles from sheets of rubber-like material comprising a box-like structure of corrugated strawboard in combination with rounded edge-members molded from papier-mâché, a fabric sheet adhered to the external surface thereof, and a layer of non-curing adhesive on the external surface of the fabric.

5. A building form for the production of hollow articles from sheets of rubber-like material comprising a box-like structure of corrugated strawboard in combination with rounded edge-members and end-pieces molded from papier-mâché, a fabric sheet adhered to the external surface thereof, and a layer of non-curing adhesive on the external surface of the fabric.

6. A building form for the production of substantially completely enclosed hollow articles from sheets of rubber-like material comprising a box-like structure of corrugated strawboard in combination with rounded edge-members and end-pieces molded from papier-mâché, a fabric sheet adhered to the external surface thereof, and a layer of non-curing adhesive on the external surface of the fabric.

7. A building form for the production of substantially completely enclosed hollow articles from sheets of rubber-like material comprising a box-like structure of corrugated boxboard in combination with rounded wooden corner-pieces having three short set-back arms with rounded external surfaces extending away from the corner, arcuate strips of boxboard extending between the adjacent corner-pieces supported on the external rounded surfaces of the arm-pieces, strips of boxboard extending between the adjacent inner corners of the form and serving to hold the corner-pieces in spaced relationship, a fabric sheet adhered to and covering the whole external surface of the form, and a layer of non-curing adhesive on the external surface of the fabric.

MILLARD R. BELL.